United States Patent
Ahnert

(10) Patent No.: US 12,000,453 B2
(45) Date of Patent: Jun. 4, 2024

(54) TORSIONAL VIBRATION DAMPER, CLUTCH DISC, AND CLUTCH

(71) Applicant: Schaeffler Technologies AG & Co. KG, Herzogenaurach (DE)

(72) Inventor: Gerd Ahnert, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 838 days.

(21) Appl. No.: 17/044,848

(22) PCT Filed: Mar. 29, 2019

(86) PCT No.: PCT/DE2019/100296
§ 371 (c)(1),
(2) Date: Oct. 1, 2020

(87) PCT Pub. No.: WO2019/196984
PCT Pub. Date: Oct. 17, 2019

(65) Prior Publication Data
US 2021/0108702 A1  Apr. 15, 2021

(30) Foreign Application Priority Data

Apr. 10, 2018 (DE) ...................... 10 2018 108 441.2

(51) Int. Cl.
*F16F 15/12* (2006.01)
*F16F 15/121* (2006.01)

(52) U.S. Cl.
CPC ........ *F16F 15/1204* (2013.01); *F16F 15/121* (2013.01); *F16F 2222/04* (2013.01); *F16F 2230/0064* (2013.01); *F16F 2232/02* (2013.01)

(58) Field of Classification Search
CPC .. F16F 15/1204; F16F 15/121; F16F 2222/04; F16F 2230/0064; F16F 2232/02
(Continued)

(56) References Cited

U.S. PATENT DOCUMENTS

| 8,821,300 | B2 * | 9/2014 | Takenaka ............ F16F 15/1232 |
| 11,015,677 | B2 | 5/2021 | Haessler et al. |
| 11,454,287 | B2 * | 9/2022 | Ahnert ................ F16F 15/1204 |

FOREIGN PATENT DOCUMENTS

| CN | 101321969 A | 12/2008 |
| CN | 101553668 A | 10/2009 |

(Continued)

*Primary Examiner* — Greg Binda

(57) ABSTRACT

A torsional vibration damper includes a rotational axis, an input part mounted about the rotational axis, an output part rotatable about the rotational axis to a limited extent relative to the input part; a spring device opposing rotation of the output part relative to the input part, a first cam mechanism, and a first intermediate element. The first intermediate element is arranged for radial displacement by the first cam mechanism when the output part rotates relative to the input part. The first intermediate element has a first intermediate element first part, and a first intermediate element second part. In an example embodiment, the damper includes a second cam mechanism and a second intermediate element arranged to be radially displaced by the second cam mechanism when the output part rotates relative to the input part. The spring device is arranged between the first intermediate element and the second intermediate element.

9 Claims, 5 Drawing Sheets

(58) Field of Classification Search
USPC .................................. 464/5; 192/70.17, 207
See application file for complete search history.

(56) References Cited

FOREIGN PATENT DOCUMENTS

| | | |
|---|---|---|
| CN | 105317925 A | 2/2016 |
| CN | 105378332 A | 3/2016 |
| CN | 105431648 A | 3/2016 |
| DE | 2742560 A1 | 4/1979 |
| DE | 19631526 A1 | 3/1997 |
| DE | 102009032340 A1 | 2/2010 |
| DE | 102014210685 A1 | 12/2014 |
| DE | 102015211899 A1 | 12/2016 |
| FR | 2738320 A1 | 3/1997 |
| GB | 1251468 | 10/1971 |
| JP | S4838658 B1 | 11/1973 |
| JP | S57173620 A | 10/1982 |
| WO | 2014202072 A1 | 12/2014 |
| WO | 2018062548 A1 | 4/2018 |

\* cited by examiner

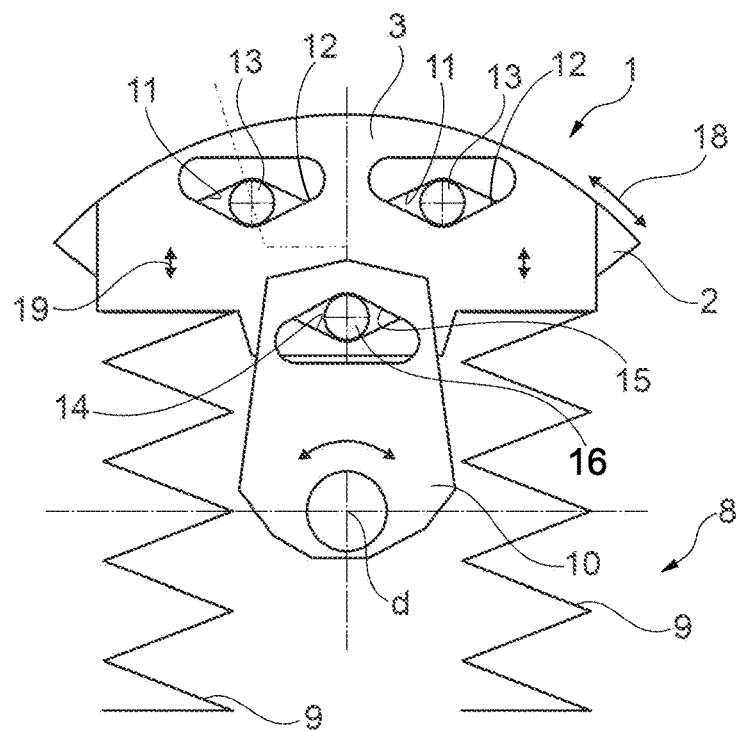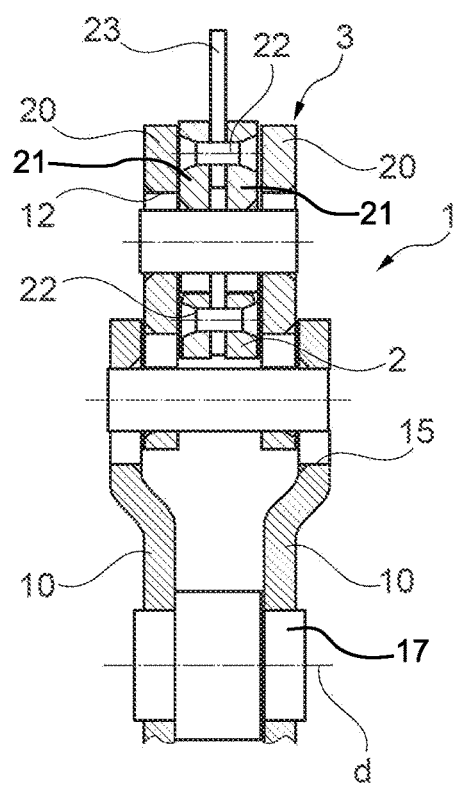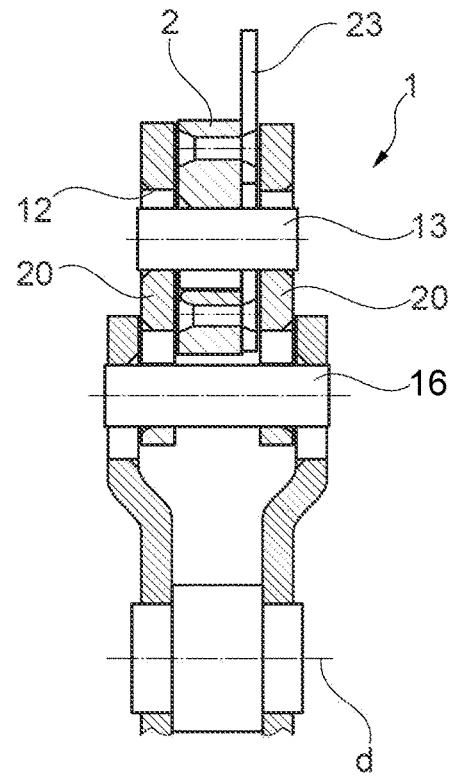
Fig. 3
Fig. 4    Fig. 5

TORSIONAL VIBRATION DAMPER, CLUTCH DISC, AND CLUTCH

CROSS-REFERENCE TO RELATED APPLICATIONS

This application is the United States National Phase of PCT Appln. No. PCT/DE2019/100296 filed Mar. 29, 2019, which claims priority to German Application No. DE102018108441.2 filed Apr. 10, 2018, the entire disclosures of which are incorporated by reference herein.

TECHNICAL FIELD

The present disclosure relates to a torsional vibration damper, e.g., for a clutch disk within a drive train of a motor vehicle, a corresponding clutch disk and a clutch, e.g., for the drive train of a motor vehicle.

BACKGROUND

Torsional vibration dampers are known in automotive engineering, for example from DE10 2015 211 899 A1, in which an input part and an output part that can be rotated to a limited extent relative to the input part are coupled by intermediate elements and spring devices, and the spring devices are not arranged in the circumferential direction. The intermediate elements are arranged centrally in the axial direction. The input part is connected to a friction ring. The formation of this connection is complex and restricts the space available for the formation and movement of the intermediate elements such that there are limits to the possible capacity of the torsional vibration damper. It has also been shown that the long-term functionality of the torsional vibration damper depends on the precision of the manufacture of the intermediate elements. The symmetry or uniformity of the roller tracks in the axial direction may be critical, so that, for example, the indispensable effects of the manufacturing method lead to problems in the operation of the torsional vibration damper and in terms of durability. For example, when the intermediate elements are manufactured using a stamping process, the entry and exit of the stamping leads to a non-uniform support surface for the rolling elements in the axial direction. This can have a detrimental effect on the movement of the individual components, since the components (input part, output part, intermediate element) can be shifted laterally during operation.

SUMMARY

The present disclosure provides a torsional vibration damper, which is of simple construction and the function of which is independent of manufacturing tolerances.

The torsional vibration damper according to the disclosure, e.g., for a clutch disk within a drive train of a motor vehicle, includes an input part which is mounted about a rotational axis and an output part Which can rotate about the rotational axis to a limited extent relative to the input part against the action of a spring device. The clutch disk has least two torque-transferring intermediate elements which are arranged between the input part and the output part and which are arranged so as to be forcibly displaced in a radial direction by means of cam mechanisms in the event of a relative rotation between the input part and the output part. The spring device is arranged between the at least two intermediate elements. Each intermediate element is designed in two parts.

An example embodiment with two intermediate elements and two spring devices can be constructed simply and efficiently damps vibrations. The spring device has at least one spring as an energy store, e.g., two springs, which are connected to the two intermediate elements. The torsional vibration damper can be designed, for example, as a split flywheel with a primary flywheel mass and a secondary flywheel mass with a spring device effectively arranged therebetween, as a torsional vibration damper arranged in a clutch disk between a lining carrier and a hub, as a lock-up damper in a torque converter or the like. The proposed torsional vibration damper includes a spring device for damping rotational or torsional vibrations, which is arranged outside of the torque path between the input part and the output part. As a result, the spring device can be designed largely independently of the torque to be transmitted via the torsional vibration damper and adapted to its actual task of vibration isolation.

A two-part construction of the intermediate element is understood to mean that it is made up of two element parts which, for example, are formed one behind the other in the axial direction (in the direction of the rotational axis). A design of two symmetrical element parts is possible. A two-part symmetrical design of each intermediate element makes it possible to form the support in the roller tracks in the intermediate element, regardless of the manufacturing method for the intermediate elements, to form a more uniform support surface for the rolling elements. At the same time, a multi-part construction of the intermediate elements allows a high degree of flexibility in the construction of the torsional vibration damper, which leads to greater possibilities in terms of the design of the damper and its characteristics.

According to an example embodiment, each intermediate element is formed from two element parts designed to be spaced apart from one another in the direction of the rotational axis. By designing the element parts to be spaced apart, a fundamentally very flexible design of the torsional vibration damper can be facilitated, in which a further component such as the input or output part is received between the element parts in the axial direction of the rotational axis. This allows a greater scope for design with regard to the design and layout of the torsional vibration damper. The two element parts may be designed symmetrically to an axis that is perpendicular to the rotational axis. As a result of the symmetrical design, a symmetrical distribution of the roller contact surfaces with respect to the rolling elements can be achieved—even when using stamped parts.

According to an example embodiment, the input part is received between the element parts. This enables a simpler and more flexible approach of a friction element of a clutch disk to the damper, since more space is now available for the connection of the friction element compared to approaches known from the prior art without this affecting the installation space available for the intermediate element and the spring device. This provides more flexibility when designing the torsional vibration damper.

In this connection, the input part may be formed from at least two input part elements. In this case, a friction element or a connecting element to a friction element can be formed between the input part elements and all three components can be connected to one another, for example by riveting. This enables a simple and inexpensive connection of the friction element and thus the clutch disk.

According to an example embodiment, each intermediate element is received between two parts of the output part. This enables a simple and flexible construction of the torsional vibration damper also with regard to the connection to an output shaft of the torsional vibration damper, which may be a transmission input shaft. In this context, each intermediate element may be formed from two element parts which are formed symmetrically between two parts of the output part.

Furthermore, a clutch disk for a clutch, e.g., in the drive train of a motor vehicle, is proposed which includes a torsional vibration damper as described here, and a clutch which includes a corresponding clutch disk. Furthermore, a motor vehicle having such a clutch is proposed. The details and advantages disclosed for the torsional vibration damper can be transferred and applied to the clutch disk, the clutch and the motor vehicle, and vice versa.

As a precaution, it should be noted that the numerals used here ("first", "second", etc.) serve primarily (only) to distinguish between several similar objects, sizes, or processes, and in particular no dependency and/or sequence of these objects, sizes or processes mandatory to each other is purported.

If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical environment will be explained in more detail below with reference to the figures. It should be pointed out that the disclosure is not intended to be limited by the exemplary embodiments shown. For example, unless explicitly stated otherwise, it is also possible to extract partial aspects of the matter explained in the figures and to combine same with other components and findings from the present description and/or figures. It should also be pointed out that the figures and, in particular, the proportions shown, are only schematic. The same reference numerals designate the same objects, so that explanations from other figures can be used as a supplement. In the figures:

FIG. 2 shows a detail of the torsional vibration damper assumed to be known;

FIG. 3 shows a detail of an example of a torsional vibration damper in the neutral, undeflected state;

FIGS. 4 and 5 show details of two examples of torsional vibration dampers in section;

DETAILED DESCRIPTION

Figures 1, 2:
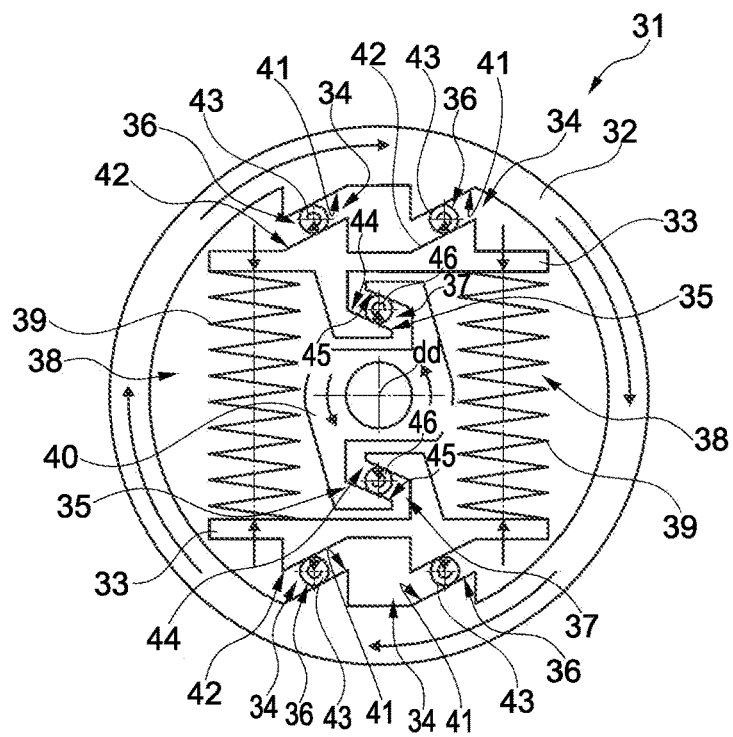
FIGS. 1 and 2 show a torsional vibration damper assumed to be known.

In the Detailed Description, the same parts are provided with the same reference symbols. The torsional vibration damper 31 shown as known in FIGS. 1 and 2 includes an input part 32, intermediate elements 33, cam mechanisms 34, 35, ramp devices 36, 37, a spring device 38 having energy stores 39 arranged between the intermediate elements 33, and an output part 40. The input part 32 of the torsional vibration damper 31 of FIG. 1 has ramps 41, such as cam tracks of the ramp devices 36, in the two cam mechanisms 34 which are opposite one another with respect to the rotational axis d of a shaft 47.

Two mutually opposite intermediate elements 33, each having two ramps 42 complementary to the input part 32, such as cam tracks of the ramp devices 36, and the rolling elements 43 complete the cam mechanism 34 between the input part 32 and the intermediate elements 33. When the input part 32 is rotated around the rotational axis dd, the rolling elements 43 are guided on the ramps 41, 42 such that the radial movement of the intermediate elements 33 results in a parallel spring compression of the two energy stores 39, which are arranged between the intermediate elements 33. The ramps 41 of the input part 32 and the ramps 42 of the intermediate elements 33 together with the associated rolling elements 43 form the cam mechanism 34.

The intermediate elements 33 each include a further ramp 44 radially on the inside, which are operatively connected to ramps 45 arranged in the output part 40. When the output part 40 is rotated around the rotational axis dd in the opposite direction to the rotation of the input part 32, the intermediate elements 33 are also guided via rolling elements 46 which roll freely between the appropriately designed ramps 44, 45 such that the movement thereof again signifies a parallel spring compression of the energy stores 39. The ramps 44 of the intermediate elements 33 and the ramps 45 of the output part 40 together with the associated rolling elements 46 form the cam mechanism 35.

As a result of the coupling of the two cam mechanisms 34, 35 via the intermediate elements 33, the total angle of rotation between the input part 32 and the output part 40 results from the sum of the angles of rotation which are set in the respective cam mechanism 34, 35 having a certain spring compression of the energy stores 39. The torque at the input part 32 for the rotational movement is supported as a pure torsional moment at the output part 40. The unit consisting of intermediate elements 33 and energy stores 39 is not subject to an external torque effect, but determines the amount of the transmitted torque via the amount of force from the parallel spring compression of the energy stores 39.

The ramps 41, 42, 44, 45 of the cam mechanisms 34, 35 of the torsional vibration damper 31 are linear in design, for example, to transmit the movements during rotation in the marked direction and to indicate the ability to transmit torque in contact via the rolling elements 43, 46 in this direction. In the case of constructions carried out, on the other hand, the design of the ramps 41, 42, 44, 45 is a free form as a result of the desired translations for the torsion characteristic curve while fulfilling the rolling conditions for the rolling elements 43, 46.

FIG. 3 shows a detail of an example of a non-deflected torsional vibration damper 1 with an input part 1 which can move in the circumferential direction 18, an intermediate element 3 which is connected to another intermediate element 3 (not shown) via a spring device 8. The movement of the intermediate element 3 in the direction of movement 19 is predetermined by the energy store 9 (spring elements) of the spring device 8. Furthermore, an output part 10 is formed which is connected to a shaft (not shown) which has the rotational axis d.

Furthermore, the torsional vibration damper 1 has rolling elements 13 which are guided by ramps 11 of the input part 2 and ramps 12 of the intermediate element 3, as discussed above. Otherwise stated, the input part includes a pair of ramp profiles 11 and the intermediate element includes a pair of ramp profiles 12. A pair of rollers 13 is arranged to roll along each pair of ramp profiles 11 and 12 to radially displace the intermediate part when the output part rotates about the rotational axis relative to the input part. Furthermore, a rolling element 16 is formed which is guided by ramps 14 of the intermediate element 3 and ramps 15 of the output part 10, as discussed above.

FIGS. 4 and 5 show details of two possible examples of torsional vibration dampers 1 in section, in which the intermediate element, or intermediate part, 3 is formed in two parts from two element parts 20. These element parts 20 are constructed symmetrically and are designed to be spaced apart from one another in the direction of the rotational axis d, so that the input part 2 can be received between the element parts 20. Otherwise stated, the input part is disposed axially between a first intermediate element part 20 and a second intermediate element part 20. In other words, the input part is disposed axially between the pair of intermediate part elements.

Output part 10 is formed in a similar manner from two parts spaced apart from one another in the direction of the rotational axis d, so that intermediate element 3 can be received therebetween. Otherwise stated, the output part includes a pair of output part elements and the intermediate part is disposed axially between the pair of output part elements. As such, as shown in FIG. 5, for example, rolling element 16, operating on intermediate element 3 and the output part elements, is longer than rolling element 13, operating on input part 2 and intermediate element 3.

In FIG. 4, the input part 2 is constructed from two input part elements 21 which are connected to one another in a non-positive and form-fitting manner via rivets 22 enabling a friction element 23 to be fixed between the input part elements 21, e.g., by the rivets 22. The rivets 22 may be countersunk and conical in order to allow a connection of the input part elements 21 that does not cause any further structural restrictions, since the rivet 2 ends flush with the respective axial outer side of the input part elements 21. The term friction element 23 is also to be understood here as an element that serves as a carrier for a friction ring, for example. For example, the friction element 23 may be part of a corresponding friction clutch (not shown here).

FIG. 5 shows an example in which the input part 2 is formed in one piece. Here, the friction element 23 is fastened to an axial surface of the input part 2 by means of corresponding rivets 22.

Figure 6:
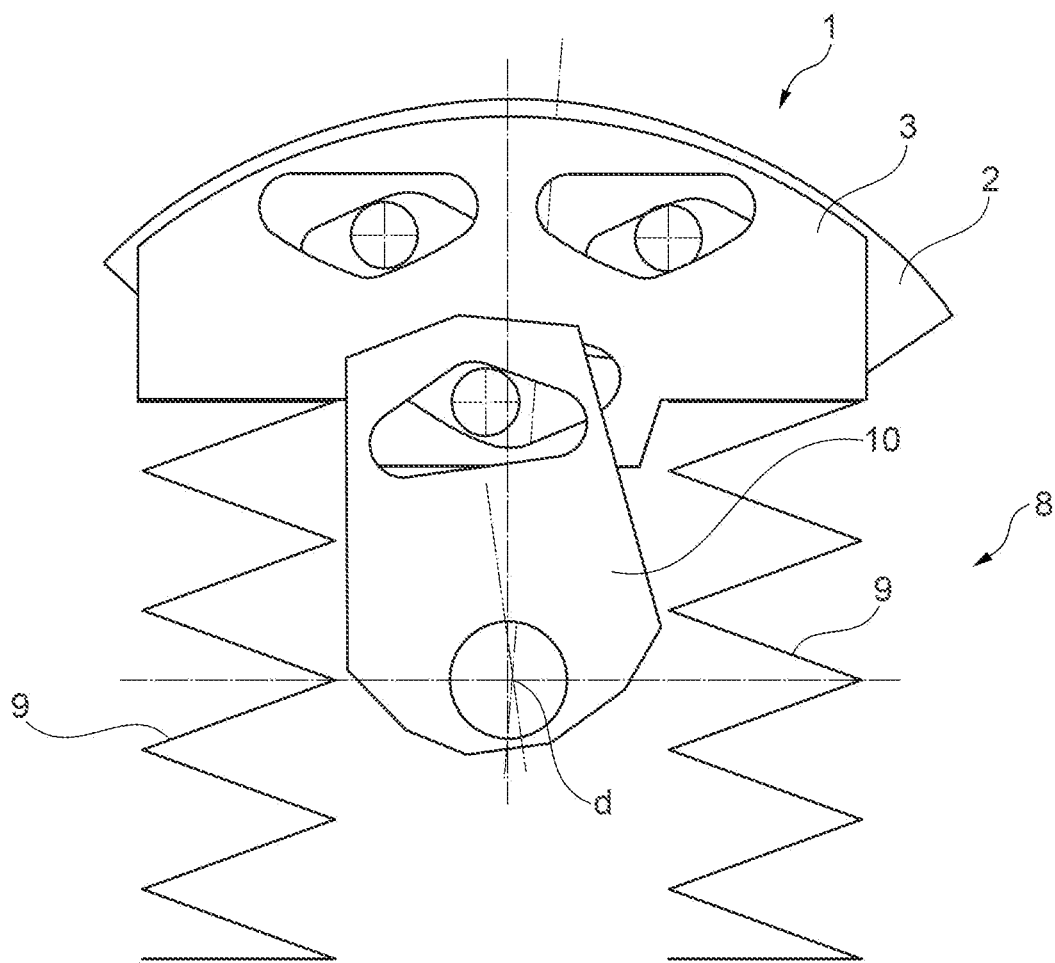
FIG. 6 shows a detail of an example of a torsional vibration damper in the deflected state.

If FIG. 2 is compared to FIGS. 4 and 5, it can be seen that, in the embodiment according to FIGS. 5 and 6, the bearing surface for the rolling elements 13, 17 in the intermediate element 3 or the element parts 20 is symmetrical and flat, while in the embodiment of FIG. 2, the influence of, for example, the non-uniformities of the support surface produced by the punch entry and exit is greater. In this way, a more uniform movement of the rolling elements 13, 16 in the respective ramp tracks 11, 12, 14, 15 can be achieved, in which a lateral movement of the components 2, 3, 10 can be reduced.

FIG. 6 shows an example of a torsional vibration damper 1 which is deflected in comparison to FIG. 3, analogously to FIG. 3.

Figure 7:
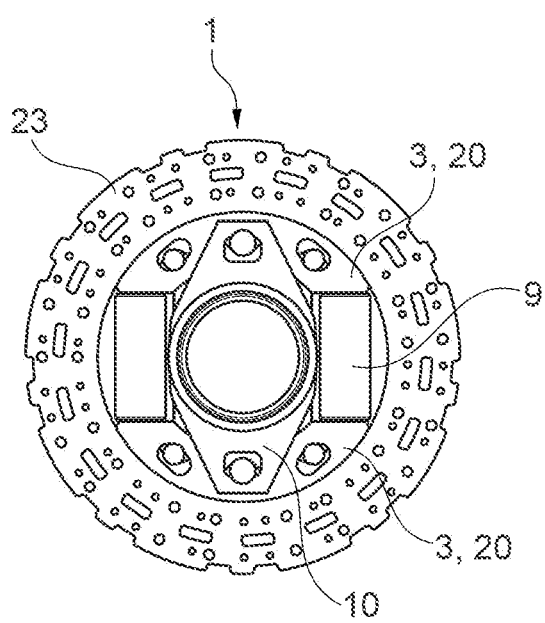
FIGS. 7 and 8 show two views of the torsional vibration damper in the non-deflected state.
Figure 8:
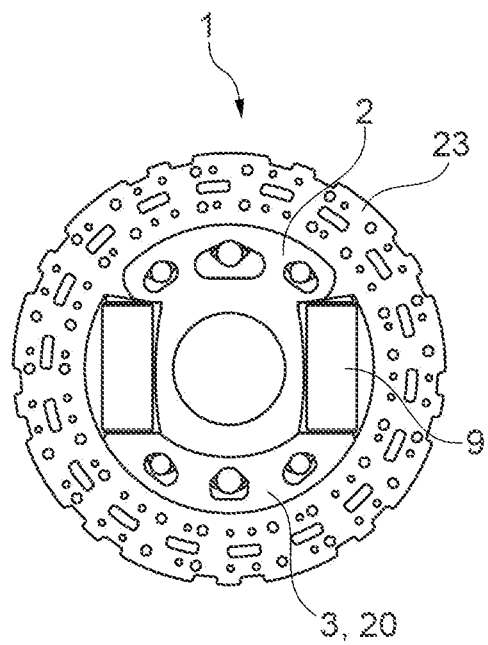
Figure 9:
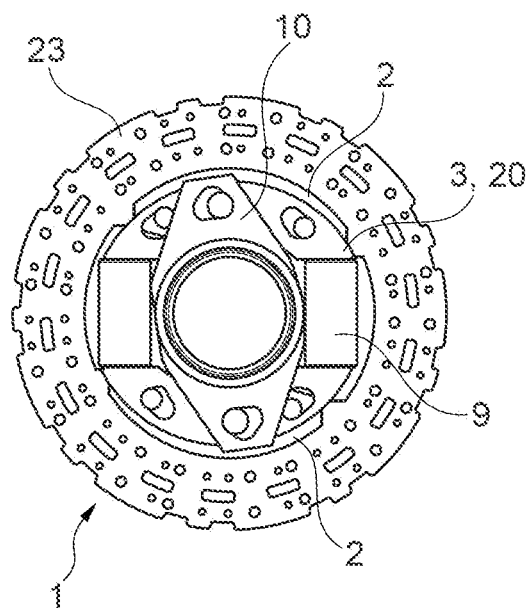
FIGS. 9 and 10 show two views of the torsional vibration damper in the deflected state.
Figure 10:
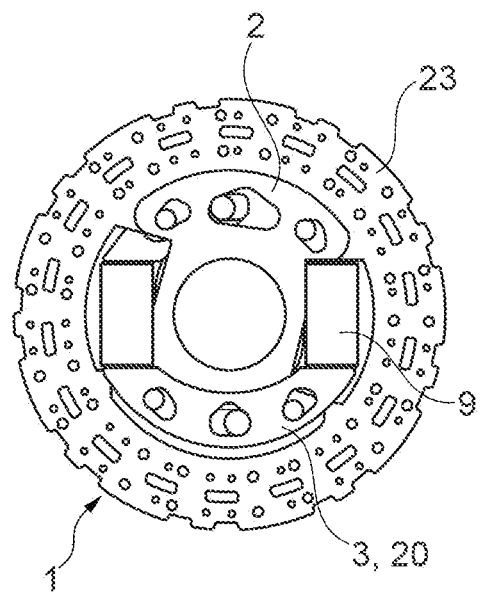

FIGS. 7 and 8 show parts of a torsional vibration damper 1 in the non-deflected state, FIGS. 9 and 10 in the deflected state. Reference is made to the above disclosure. FIGS. 7 to 10 show that a simple connection of the friction element 23 to the input part 2 is possible without the shape and the range of movement of the intermediate elements 3 being restricted as a result. The intermediate elements 3 or the element parts 20 can use the maximum installation space and in particular the maximum possible radius in the clutch disk, so that the size of the spring devices 8 and in particular the energy store (springs) 9 can be optimized, so that the energy store 9 can provide a large spring energy.

Figure 11:
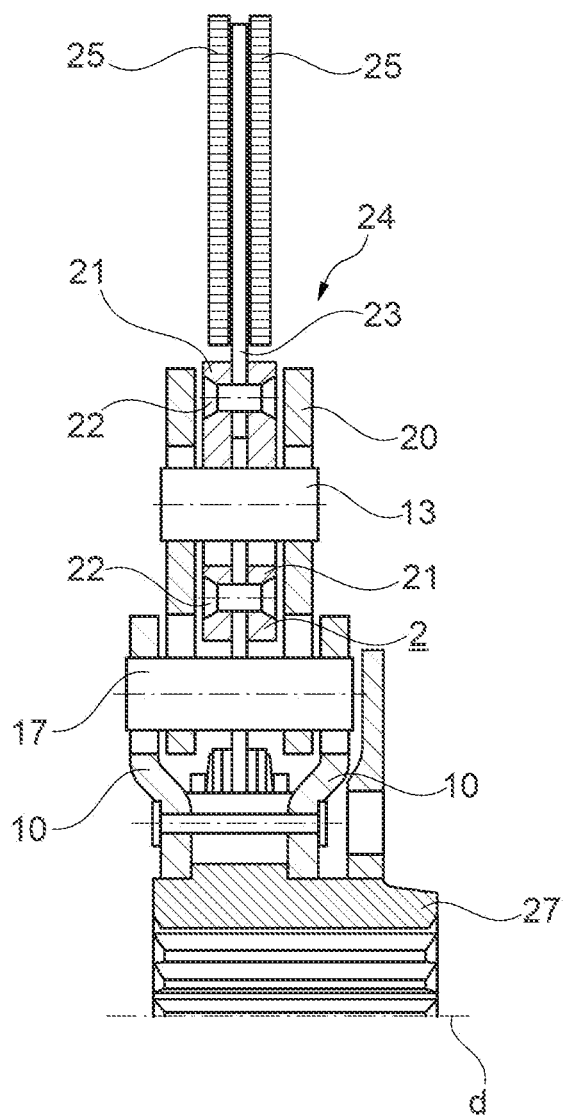
FIG. 11 shows an example of a clutch disk.

FIG. 11 shows a clutch disk 24 with a torsional vibration damper 1 as described, for example, in connection with FIG. 4. Reference is made to the embodiments outlined above. The friction element 23 is connected to the input part elements 21 by rivets 22. The friction element 23 has friction surfaces 25 which can be detachably connected via a frictional connection to corresponding friction partners (not shown) forming a clutch.

Furthermore, a hub flange 26 is shown which can be connected via an intermediate toothing 27 to a hub (not shown) which in turn can be connected to a shaft, for example a transmission input shaft.

Figure 12:
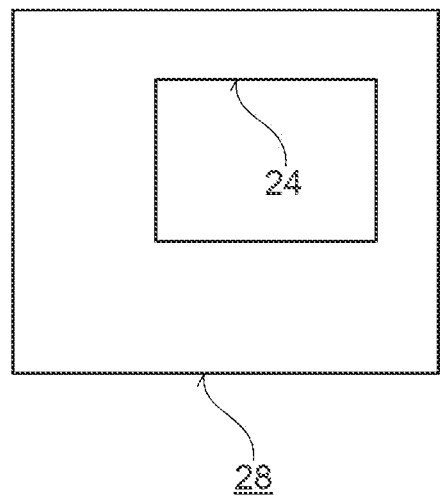
FIG. 12 very schematically shows a clutch.

Finally, FIG. 12 very schematically shows a clutch 28 with a clutch disk 24. The clutch 28 can, for example, be arranged in the drive train of a motor vehicle.

REFERENCE NUMERALS

1 Torsional vibration damper
2 Input part
3 Intermediate element
4 Cam mechanism
5 Cam mechanism
6 Ramp device
7 Ramp device
8 Spring device
9 Energy store
10 Output part
11 Ramp
12 Ramp
13 Rolling element
14 Ramp
15 Ramp
16 Rolling element
17 Shaft
18 Circumferential direction
19 Direction of movement
20 Element part
21 Input part elements
22 Rivet
23 Friction element
24 Clutch disk
25 Friction surface
26 Hub
27 Intermediate gearing
28 Clutch
31 Torsional vibration damper
32 Input part
33 Intermediate element
34 Cam mechanism
35 Cam mechanism
36 Ramp device
37 Ramp device
38 Spring device
39 Energy store
40 Output part
41 Ramp
42 Ramp
43 Rolling element
44 Ramp
45 Ramp
46 Rolling element
47 Shaft
dd Rotational axis

The invention claimed is:

1. A torsional vibration damper comprising:
   a rotation axis;
   an input part comprising a first ramp profile;
   an output part comprising a second ramp profile;
   an intermediate part comprising a pair of axially offset intermediate part elements, each of the pair of intermediate part elements comprising:
      a third ramp profile; and
      a fourth ramp profile;
   a first roller contacting the first ramp profile and the third ramp profile; and
   a second roller contacting the second ramp profile and the fourth ramp profile, wherein:
      the first roller and the second roller are arranged to roll along their respective ramp profiles when the output part rotates about the rotational axis relative to the input part; and
      the intermediate part is radially translated by the first roller and the second roller when the output part rotates about the rotational axis relative to the input part.

2. The torsional vibration damper of claim 1, further comprising a third roller, wherein:
   the input part comprises a fifth ramp profile;
   each of the pair of intermediate part elements comprises a sixth ramp profile; and
   the third roller is arranged to roll along the fifth ramp profile and the sixth ramp profile to radially translate the intermediate part when the output part rotates about the rotational axis relative to the input part.

3. The torsional vibration damper of claim 1 wherein the second roller is longer than the first roller.

4. The torsional vibration damper of claim 1 wherein a portion of the input part is disposed axially between the pair of intermediate part elements.

5. The torsional vibration damper of claim 4 wherein the input part comprises a pair of input part elements.

6. The torsional vibration damper of claim 1 wherein:
   the output part comprises a pair of output part elements; and
   a portion of the intermediate part is disposed axially between the pair of output part elements.

7. The torsional vibration damper of claim 1 further comprising a pair of spring elements opposing radially inward translation of the intermediate part.

8. The torsional vibration damper of claim 1 wherein the input part further comprises a friction disk having a portion disposed axially between the pair of intermediate part elements.

9. The torsional vibration damper of claim 8 wherein:
   the input part comprises a pair of input part elements; and
   the portion of the friction disk is disposed axially between the pair of input part elements.

* * * * *